US011418613B2

(12) United States Patent
White

(10) Patent No.: US 11,418,613 B2
(45) Date of Patent: Aug. 16, 2022

(54) SYSTEMS AND METHODS FOR RECORDING METADATA ABOUT MICROSERVICES FOR REQUESTS TO THE MICROSERVICES

(71) Applicant: Citrix Systems, Inc., Fort Lauderdale, FL (US)

(72) Inventor: Jeremy White, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/358,887

(22) Filed: Jun. 25, 2021

(65) Prior Publication Data
US 2021/0320982 A1 Oct. 14, 2021

Related U.S. Application Data

(63) Continuation of application No. 16/415,807, filed on May 17, 2019, now Pat. No. 11,057,487.

(51) Int. Cl.
*H04L 67/63* (2022.01)
*H04L 67/561* (2022.01)
*G06F 16/17* (2019.01)

(52) U.S. Cl.
CPC ...... *H04L 67/2804* (2013.01); *G06F 16/1734* (2019.01); *H04L 67/327* (2013.01)

(58) Field of Classification Search
CPC .......... H04L 67/2804; H04L 67/327; G06F 16/1734
See application file for complete search history.

(56) References Cited

U.S. PATENT DOCUMENTS

| | | |
|---|---|---|
| 2016/0021197 A1 | 1/2016 | Pogrebinsky et al. |
| 2018/0088925 A1 | 3/2018 | Emeis et al. |
| 2018/0113680 A1 | 4/2018 | Browning |
| 2018/0288135 A1 | 10/2018 | Narayan et al. |
| 2018/0309630 A1* | 10/2018 | Zhao ...................... H04L 67/18 |

(Continued)

OTHER PUBLICATIONS

Final Office Action on U.S. Appl. No. 16/415,807 dated Aug. 7, 2020 (7 pages).

(Continued)

*Primary Examiner* — Viet D Vu
(74) *Attorney, Agent, or Firm* — Foley & Lardner LLP

(57) ABSTRACT

Described embodiments provide systems and methods for recording metadata about a microservice for requests to the microservice. A device configured as a proxy to one or more microservices of a service can receive a registration request to register a microservice of the one or more microservices with the device. Metadata can be received during registration of the microservice with the device. The metadata can identify an identifier of the microservice, a deployment version of the microservice and a region of deployment of the microservice. The device can store the metadata in association with the microservice and record the metadata of the microservice registered with the device in association with a plurality of requests. The device can identify, via a user interface and the metadata recorded to the log, a change in operation of the microservice in connection with one of the deployment version or the region of the microservice.

20 Claims, 12 Drawing Sheets

(56) References Cited

U.S. PATENT DOCUMENTS

| | | |
|---|---|---|
| 2018/0322437 A1 | 11/2018 | McClory et al. |
| 2019/0238636 A1 | 8/2019 | Li et al. |
| 2020/0042328 A1* | 2/2020 | Gupta .................... H04L 67/34 |
| 2020/0336553 A1 | 10/2020 | Yeddula et al. |

OTHER PUBLICATIONS

International Search Report and Written Opinion on International Appl No. PCT/US2020/032577, dated Aug. 13, 2020.

Non-Final Office Action on U.S. Appl. No. 16/415,807 dated Apr. 6, 2020.

Non-Final Office Action on U.S. Appl. No. 16/415,807 dated Dec. 28, 2020.

Notice of Allowance on U.S. Appl. No. 16/415,807 dated Mar. 8, 2021.

Pina, Fabio, et al., "Nonintrusive Monitoring of Microservice-Based Systems", 2018 IEEE 17th INTE RNAT IONA L Symposium on Network Computing and Applications (NCA), IEEE, Nov. 1, 2018 (Nov. 1, 2018), pp. 1-8, XP033459537, DOI: 10.1109/NCA.2018.8548311 [retrieved on Nov. 26, 2018].

Zhao, J T, et al, "Management of API Gateway Based on Microservice Architecture", Journal of Physics: Conference Series, vol. 1087, Sep. 1, 2018 (Sep. 1, 2018), p. 032032, XP055719453, GB, ISSN: 1742-6588, DOI: 10.1088/17426596/1087/3/032032.

International Preliminary Report on Patentability for PCT Appl. No. PCT/US2020/032577 dated Dec. 2, 2021.

\* cited by examiner

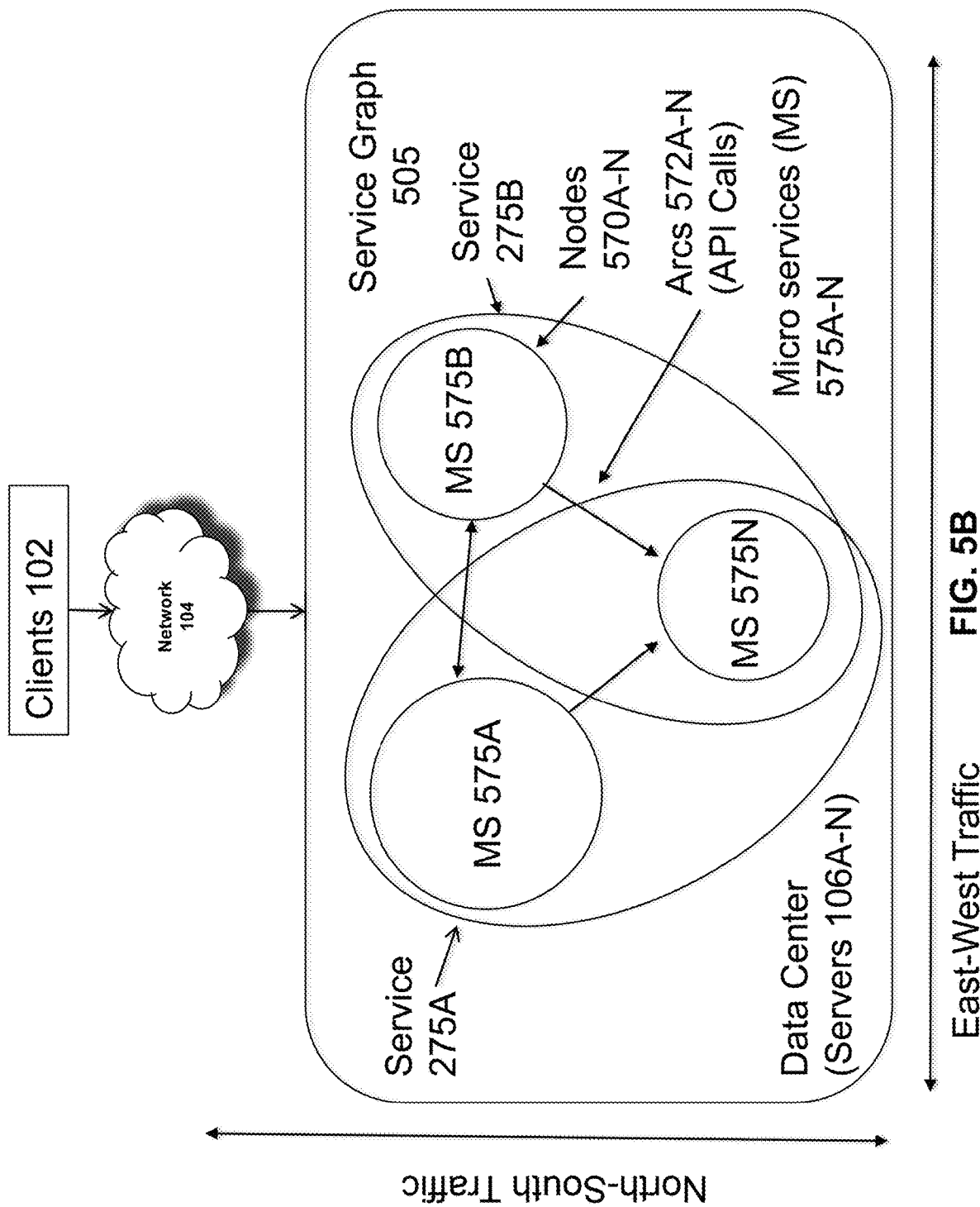

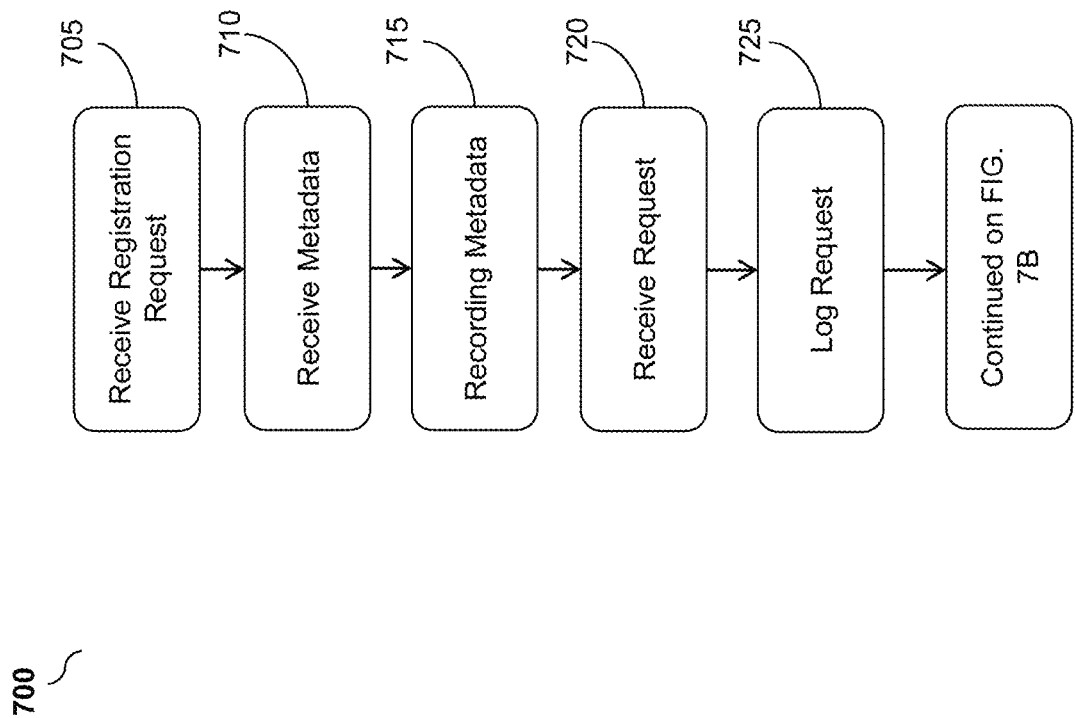

SYSTEMS AND METHODS FOR RECORDING METADATA ABOUT MICROSERVICES FOR REQUESTS TO THE MICROSERVICES

CROSS-REFERENCE TO RELATED APPLICATION

This application is a continuation of and claims priority to and the benefit of U.S. patent application Ser. No. 16/415,807, titled "SYSTEMS AND METHODS FOR RECORDING METADATA ABOUT MICRO SERVICES FOR REQUESTS TO THE MICRO SERVICES," filed on May 17, 2019 and issued as U.S. Pat. No. 11,057,487, the contents of all of which are hereby incorporated herein by reference in its entirety for all purposes.

BACKGROUND

Devices can include or use a plurality of software applications to perform a variety of different functions. The applications can be built a single, autonomous unit such that the applications are self-contained and independent from other applications executing on a device. However, to update the applications, changes can impact the entire application or device executing the respective application. For example, a modification to a small section of code can require building and deploying an entirely new version of software for the application.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for recording metadata about a microservice for requests to the microservice. An intermediary device can register one or more microservices and route or monitor one or more requests to the one or more microservices. For example, the intermediary device can disposed between a plurality of microservices and one or more requestors. The microservices can, during the registration process, provide the intermediary device with metadata corresponding to the microservice. The metadata can include a region the microservice is deployed, a deployment version of the microservice and/or an environment of the microservice. The intermediary device can record the metadata to proxy or route requests to the microservice from one or more requestors. In embodiments, the regions or deployment versions of the microservice can change, be modified or updated causing future or subsequent calls or requests to the microservice to fail or cause an error. The device can identify changes in the metadata to correct errors or avoid errors in routing requests from one or more requestors to one or more microservices.

In at least one aspect, a method for recording metadata about a microservice for requests to the microservice. The method can include receiving, by a device configured as a proxy to one or more microservices of a service, a registration request to register a microservice of the one or more microservices with the device. The method can include receiving, by the device during registration of the microservice with the device, metadata provided by the microservice about the microservice. The metadata can identify an identifier of the microservice, a deployment version of the microservice and a region of deployment of the microservice. The device can store the metadata in association with the microservice. The method can include recording, by the device responsive to a plurality of requests to access the microservice, to a log the metadata of the microservice registered with the device in association with each of the plurality of requests. The method can include identifying, by the device via a user interface and based on the metadata recorded to the log, a change in operation of the microservice in connection with one of the deployment version or the region of the microservice.

In embodiments, the method can include routing requests to the one or more microservices to the device. The method can include receiving, by the device, the metadata one of as part of or included with the registration request. The method can include receiving, by the device during registration, from the microservice metadata comprising a product identifier, an operating system and an environment in which the microservice operates. The method can include identifying, by the device based at least on the log, the change in operation of the microservice attributable to one or more changes to the microservice identified by one of the product identifier, the operating system and the environment.

In some embodiments, the method can include receiving, by the device intermediary to the one or more microservices, the plurality of requests from one or more requestors. The method can include receiving, by the device, the plurality of requests one of routed or forwarded to the device. The method can include receiving, by the device, from the microservice one or more updates to the metadata of the microservice. The method can include identifying, by the device based at least on the log, an issue with operation of the microservice attributable to a change in the deployment version or the region of the microservice. The method can include identifying, by the device based at least on the log, an improvement in operation of the microservice attributable to one or more changes to the microservice identified in the metadata.

In at least one aspect, a system for recording metadata about a microservice for requests to the microservice is provided. The system can include a device comprising one or more processors, coupled to memory and configured as a proxy to one or more microservices of a service. The device can be configured to receive a registration request to register a microservice of the one or more microservices with the device. The device can be configured to receive, during registration of the microservice with the device, metadata provided by the microservice about the microservice. The metadata can identify an identifier of the microservice, a deployment version of the microservice and a region of deployment of the microservice. The device can be configured to store the metadata in association with the microservice. The device can be configured to record, responsive to a plurality of requests to access the microservice, to a log the metadata of the microservice registered with the device in association with each of the plurality of requests. The device can be configured to identify, via a user interface and based on the metadata recorded to the log, a change in operation of the microservice in connection with one of the deployment version or the region of the microservice.

In embodiments, the plurality requests to the one or more microservices can be routed to the device. The device can be configured to receive the metadata as part of or included with the registration request. The device can be configured to receive, during registration, from the microservice the metadata comprising a product identifier, an operating system and an environment in which the microservice operates. The device can be configured to identify, based at least on the log, the change in operation of the microservice attributable to one or more changes to the microservice identified by one of the product identifier, the operating system and the environment. The device can be configured to receive, intermediary to the one or more microservices, the plurality of requests from one or more requestors.

In some embodiments, the device can be configured to receive the plurality of requests one of routed or forwarded to the device. The device can be configured to receive from the microservice one or more updates to the metadata of the microservice. The device can be configured to identify, based at least on the log, an issue with operation of the microservice attributable to a change in the deployment version or the region of the microservice. The device can be configured to identify, based at least on the log, an improvement in operation of the microservice attributable to one or more changes to the microservice identified in the metadata.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 5B is a block diagram of a service graph, in accordance with an illustrative embodiment;

FIGS. 7A-7B are a flow diagram of a method for recording metadata about a microservice for requests to the microservice.

Figure 1A:
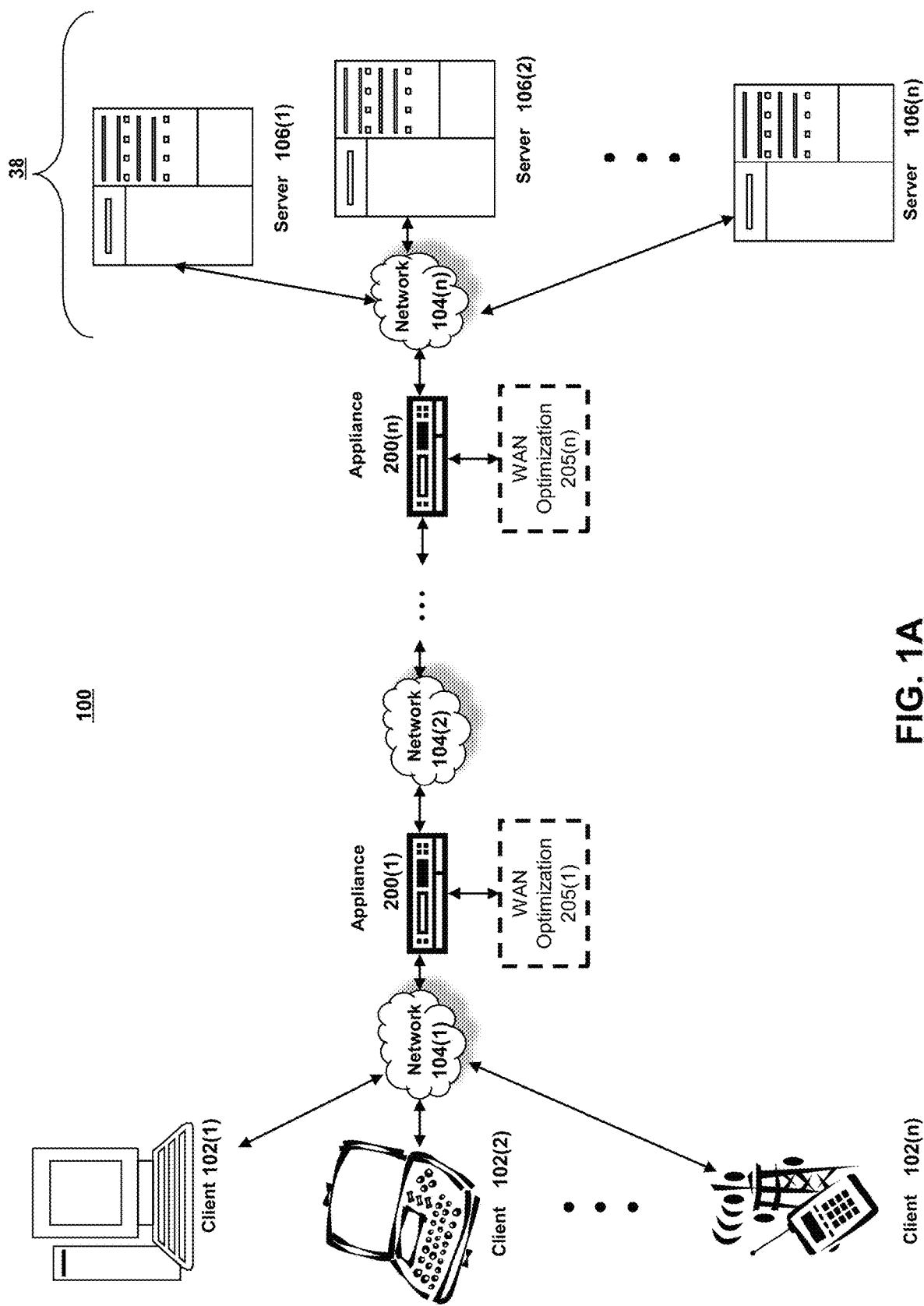
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes implementation of systems and methods for a service graph based platform and technology; and Section F describes embodiments of systems and methods for recording metadata about a microservice for requests to the microservice.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
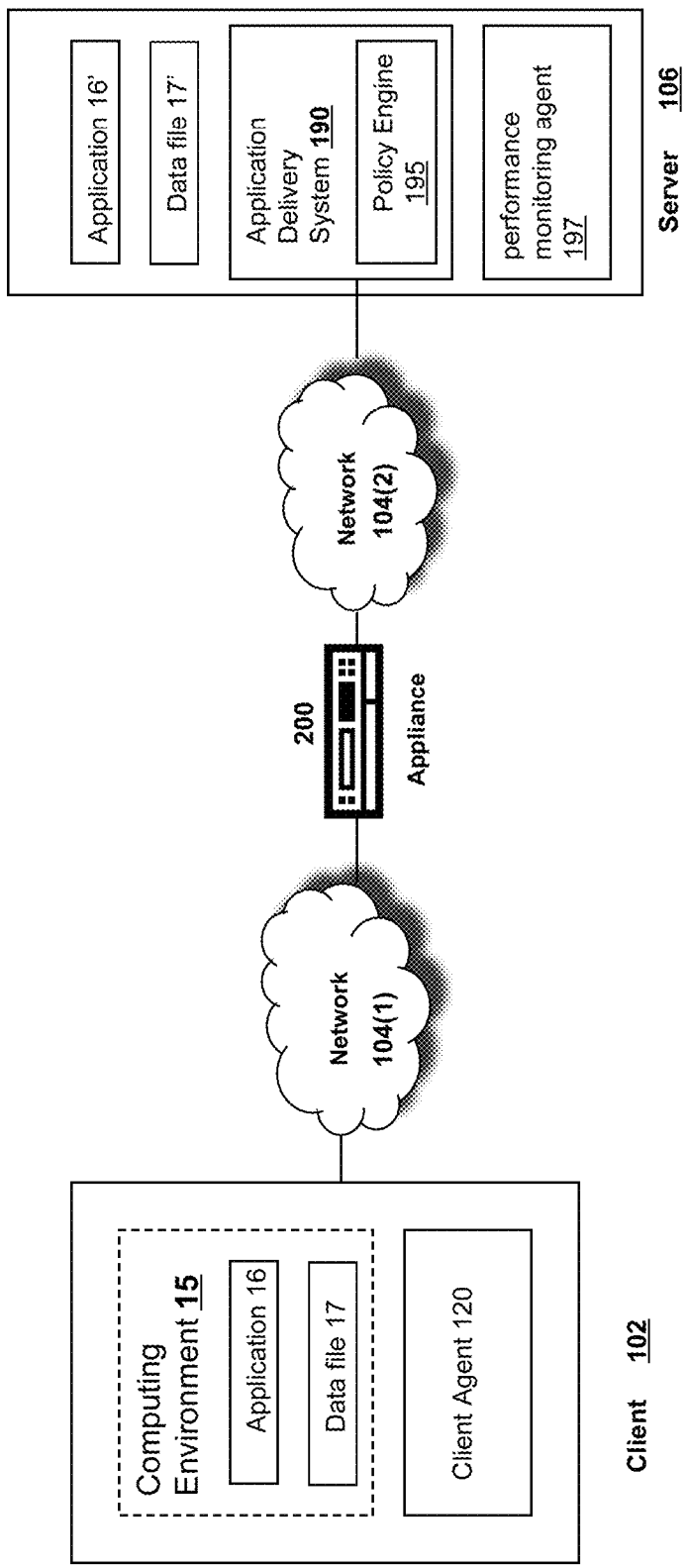
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
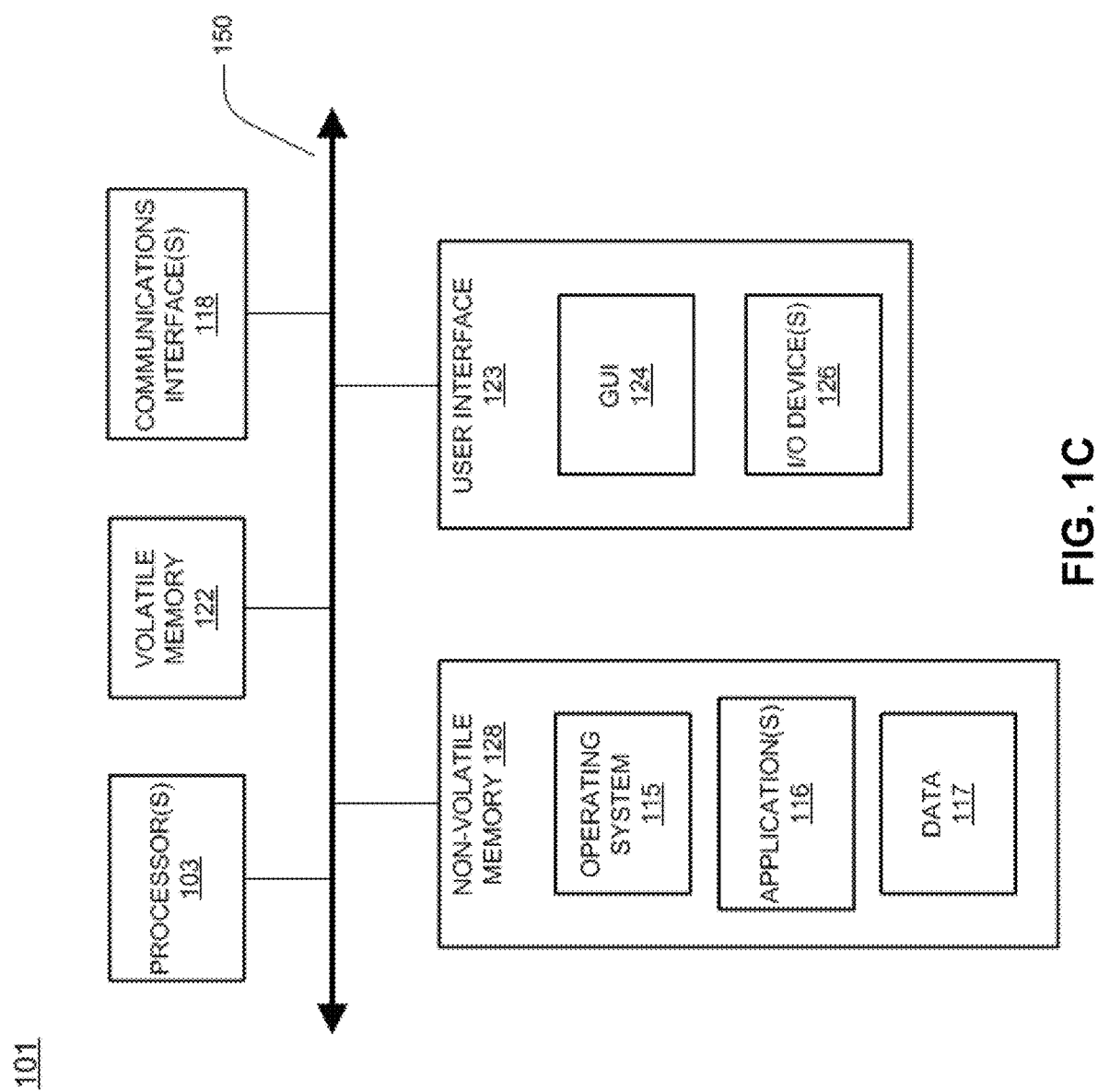
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
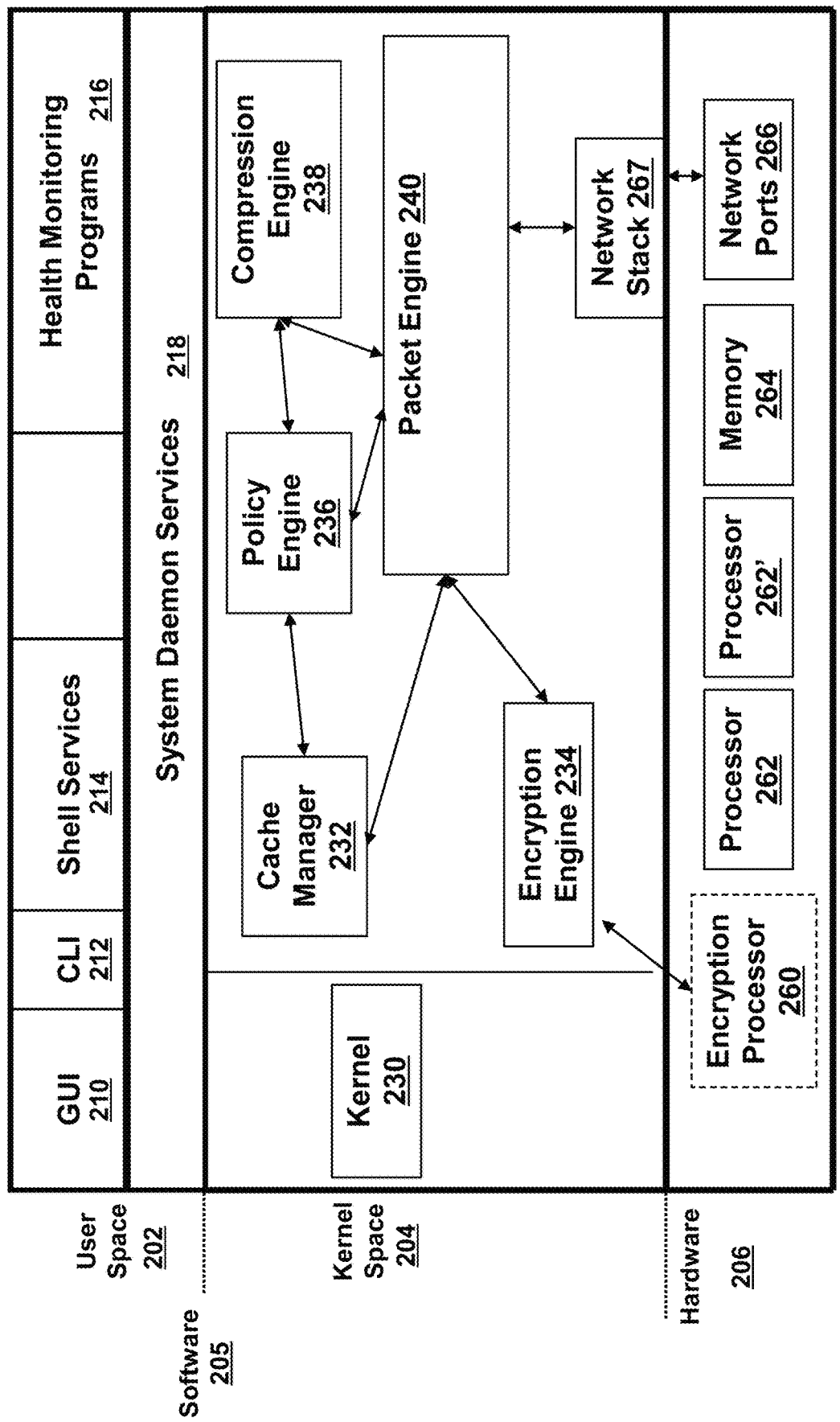
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
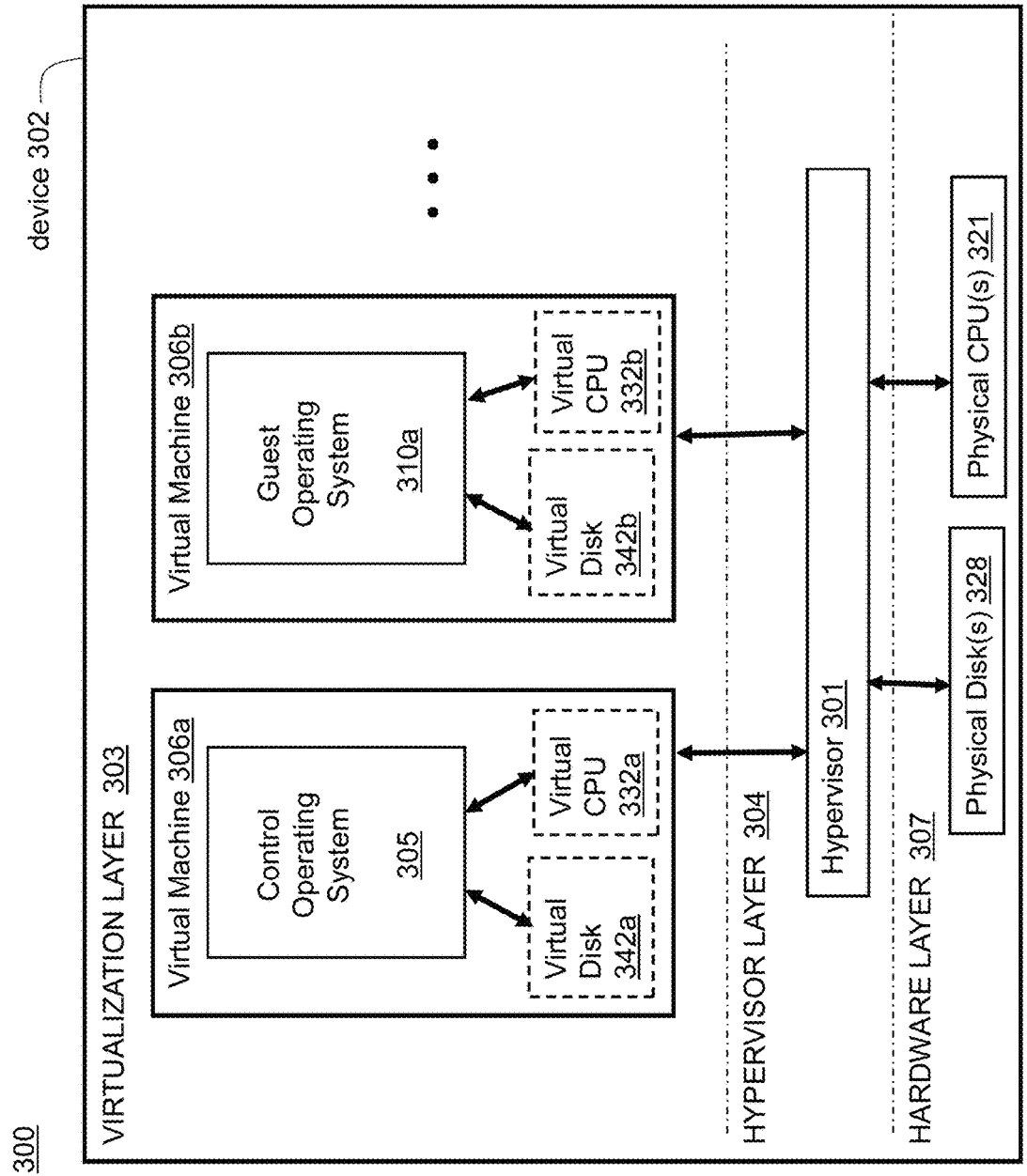
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
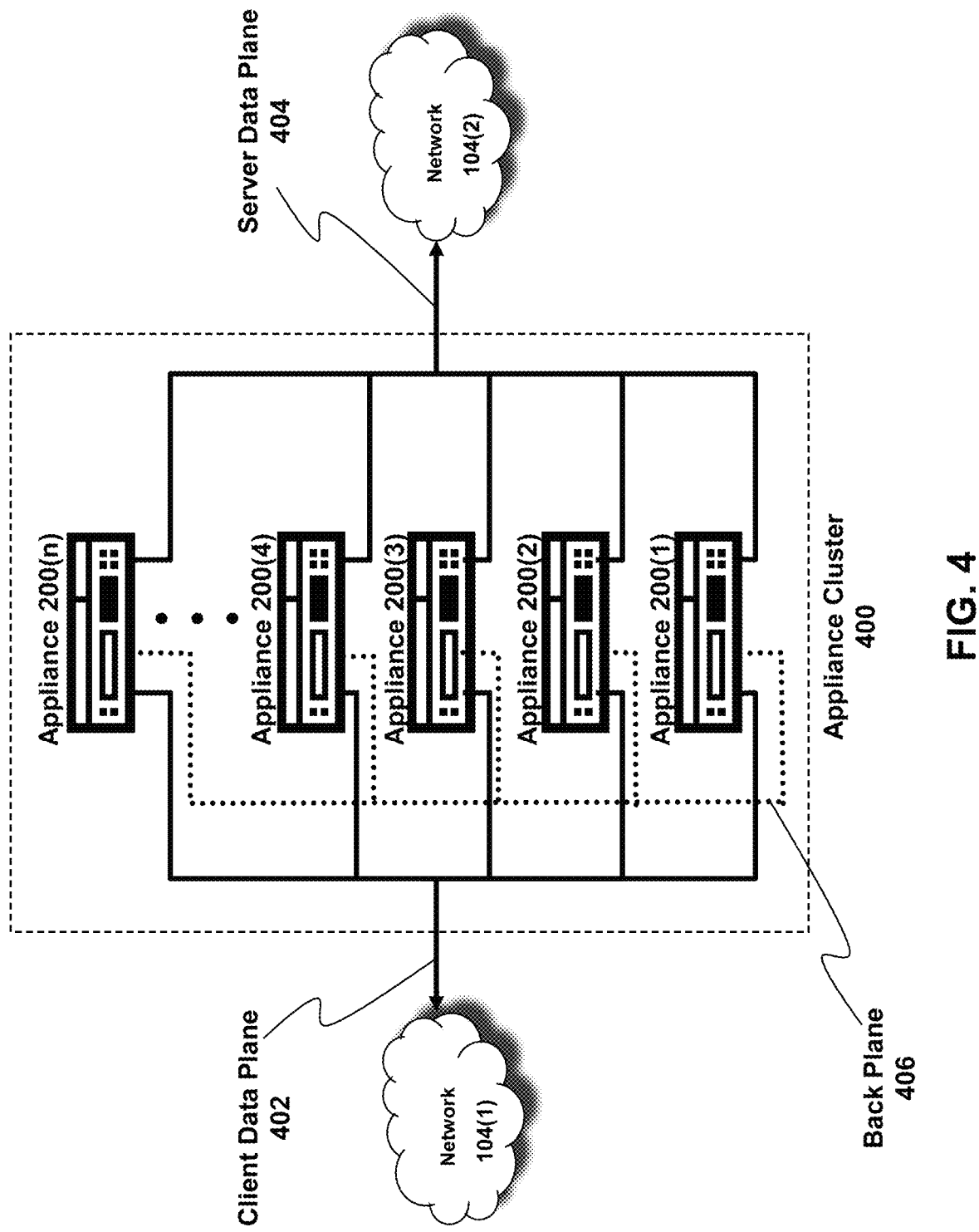
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Service Graph Based Platform and Technology

Figure 5A:
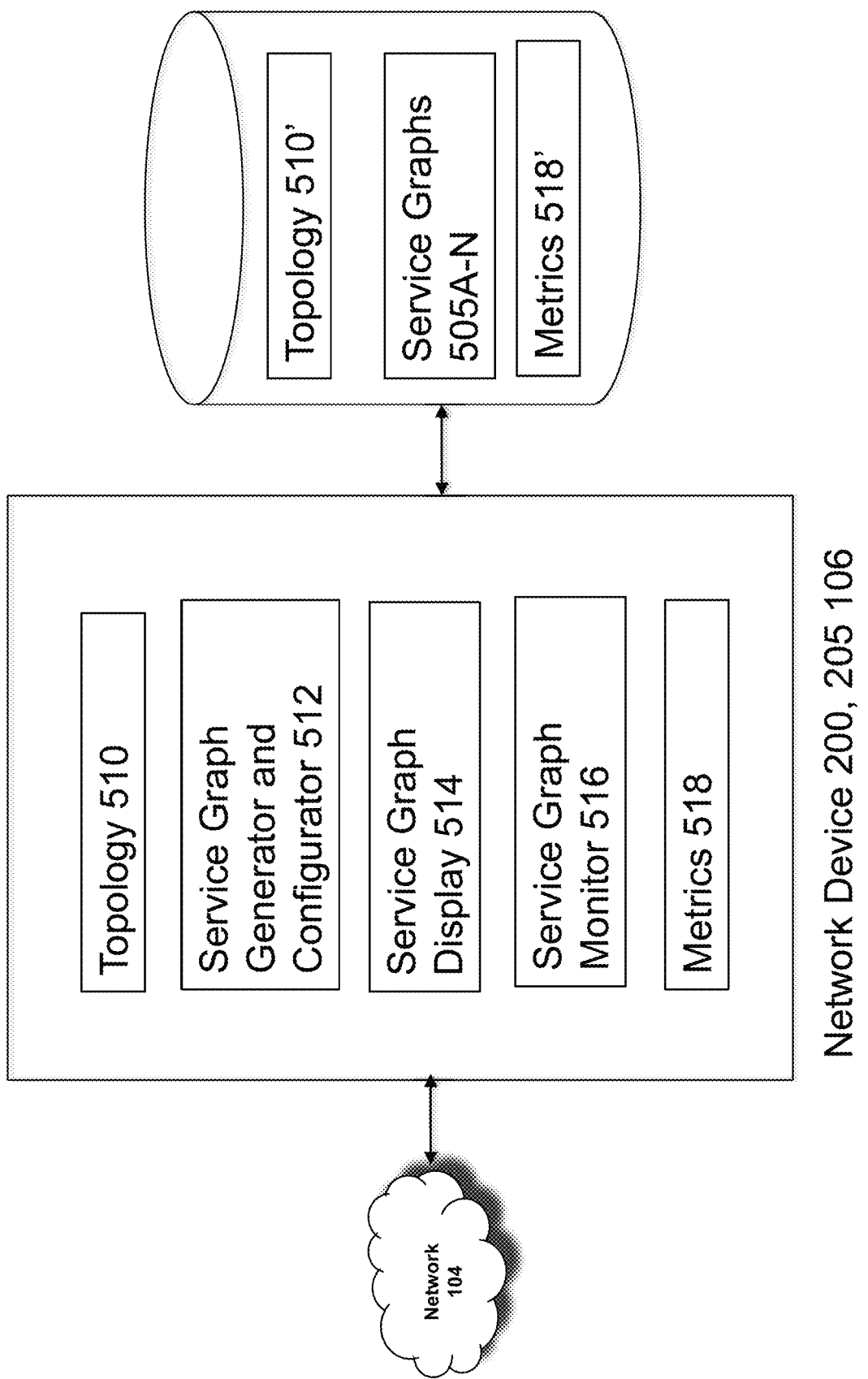
FIG. 5A is a block diagram of a service graph based system, in accordance with an illustrative embodiment.
Figure 5C:
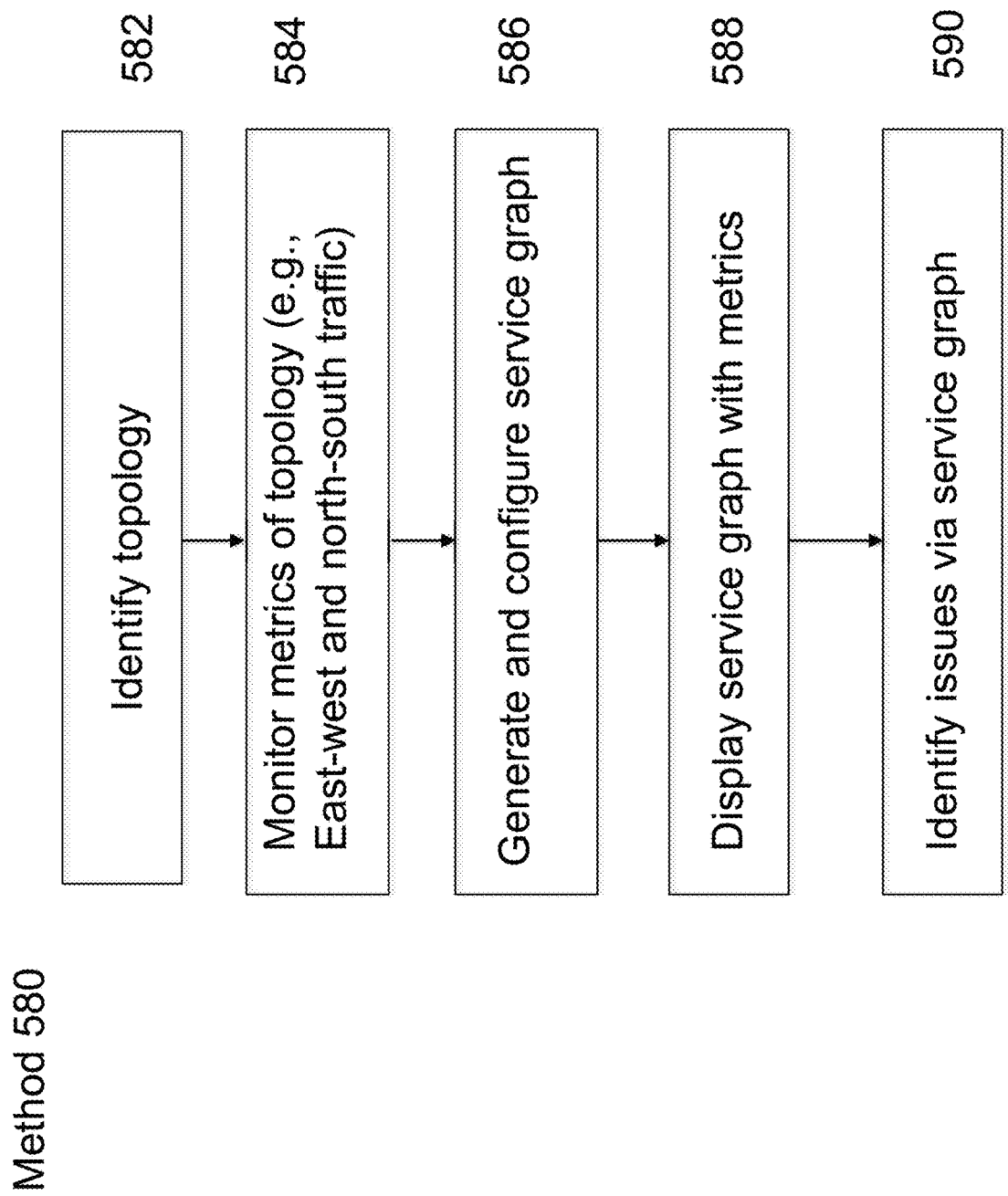
FIG. 5C is a flow diagram of a method of using a service graph, in accordance with an illustrative embodiment.

Referring now to FIGS. 5A-5C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 5A, an implementation of a system for service graphs, such as those illustrated in FIG. 5B, will be described. A device on a network, such as a network device 200, 205 or a server 206, may include a service graph generator and configurator 512, a service graph display 514 and service graph monitor 516. The service graph generator and configurator 512 (generally referred to as service graph generator 512), may identify a topology 510 of elements in the network and metrics 518 related to the network and the elements, to generate and/or configure service graphs 505A-N. The service graphs 505A-N (generally referred to as service graphs 505) may be stored in one or more databases, with any of the metric 518' and/or topology 510'. The service graphic generator 512 may generate data of the service graphs 505 to be displayed in a display or rendered form such as via a user interface, generated referred to as service graph display 514. Service graph monitor 516 may monitor the network elements of the topology and service for metrics 518 to configure and generate a service graph 505 and/or to update dynamically or in real-time the elements and metrics 518 of or represented by a service graph display 514.

The topology 510 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 505 may include data representing the topology of a service 275, such any elements making up such a service or used by the service, for example as illustrated in FIG. 5B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage such as a database in a manner in order for the service graph generator to generate a service graph in memory and/or render the service graph in display form 514.

The service graph generator 512 may include an application, program, library, script, service, process, task or any type and form of executable instructions for establishing, creating, generating, implementing, configuring or updating a service graph 505. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 514 may include any graphical or electronic representation of a service graph 505 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 518 may include an application, program, library, script, service, process, task or any type and form of executable instructions to receive, identify, process metrics 518 of the topology 510. The service graph monitor 518 monitors via metrics 518 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 518, 518' (generally referred to as metrics 518) may be stored on network device in FIG. 5B, such as in memory or storage. The metrics 518, 518' may be stored in a database on the same device or over a network to another device, such as a server. Metrics may include any type and form of measurement of any element of the topology, service or network. Metrics may include metrics on volume, rate or timing of requests or responses received, transmitted or traversing the network element represented by the node or arc. A Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 5B illustrates an implementation of a service graph in connection with micro-services of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 575A-575N (generally referred to as microservice or micro service 575). Service 275A may include microservice 575A and 575N while service 275B may include microservice 575B and 575N. The microservices may communicate among the microservices via application programming interface (APIs). A service graph 505 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 5B. East-west network traffic generally describes and is related to network traffic between elements in the data centers, such as data center to data center, server to server, service to service or microservice to microservice.

A service 275 may comprise microservices 575. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 505 may include multiple nodes 570A-N connected or linked via one or more arcs 572A-572N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 570 may identify a state, a status and/or metric(s) of the element represented by the node. Graphical features of the node may identify or specify an operational or performance characteristic of the element represented by the node. A size, color or shape of the node may identify an operational state of whether the element is operational or active. A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 572 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 5C, an implementation of a method for generating and displaying a service graph will be described. In brief overview of method 580, at step 582, a topology is identified, such as for a configuration of one or more services. At step 584, the metrics of elements of the topology, such as for a service are monitored. At step 586, a service graph is generated and configured. At step 588, a service graph is displayed. At step 590, issues with configuration, operation and performance of a service or the topology may be identified or determined.

At step 582, a device identifies a topology for one or more services. The device may obtain, access or receive the topology 510 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 584, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 586, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 588, a service graph is displayed. The device, such as via service graph generator, may create a service graph display 514 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 590, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

F. Recording Metadata About a Microservice for Requests to the Microservice

The present disclosure is directed towards systems and methods for recording metadata about a microservice for requests to the microservice. A device (e.g., proxy) can be disposed between a plurality of microservices to route and monitor calls received from one or more requestors and intended for one or more microservices. The microservices can register with the device for the device to act as a proxy and route calls or requests to the respective microservice. For example, the device can route calls to one or more microservices based in part pm a region of the microservice or deployment version of the microservice. The regions or deployment versions of the microservice can change, be modified or updated causing future or subsequent calls or requests to the microservice to fail or cause an error. The errors can be difficult to identify or determine a root cause. In embodiments described herein, the device can record metadata and identify changes or updates to the metadata for one or more microservices to correct errors or avoid errors in routing call or requests. For example, during the registration, the microservice can provide metadata to the device that the device can use for future or subsequent calls or requests for the microservice. The device can use the metadata for correlation and analysis. For example, the device can use the metadata to determine or identify errors associated with regional issues, deployment versions or calls made to a specific service. The time for resolution of the errors can be reduced by providing a more efficient and faster method to identify reasons for the errors or issues occurring.

In embodiments, all calls or infrastructure call can be routed through the device (e.g., proxy). The device can establish call logs and record metadata for the microservices and calls routed. The device can generate metrics corresponding to the microservices and calls routed. In embodiments, the device can store metadata including, but not limited to, identifiers, product name, service name, operating system, deployment version, region, and environment. The device can identify and determine changes or updates to the metadata. For example, the device can determine an error is associated with a change in region of a microservice or deployment version of a microservice. The device can update the metadata and route the call or request to the appropriate microservice responsive to the changes or updates. The device can map performance improvements and error improvements based in part on specific deployment versions. The device can provide a validation that an error has been corrected, for example, that a code change resolved an issue or improved a service corresponding to one or more microservices.

Figure 6:
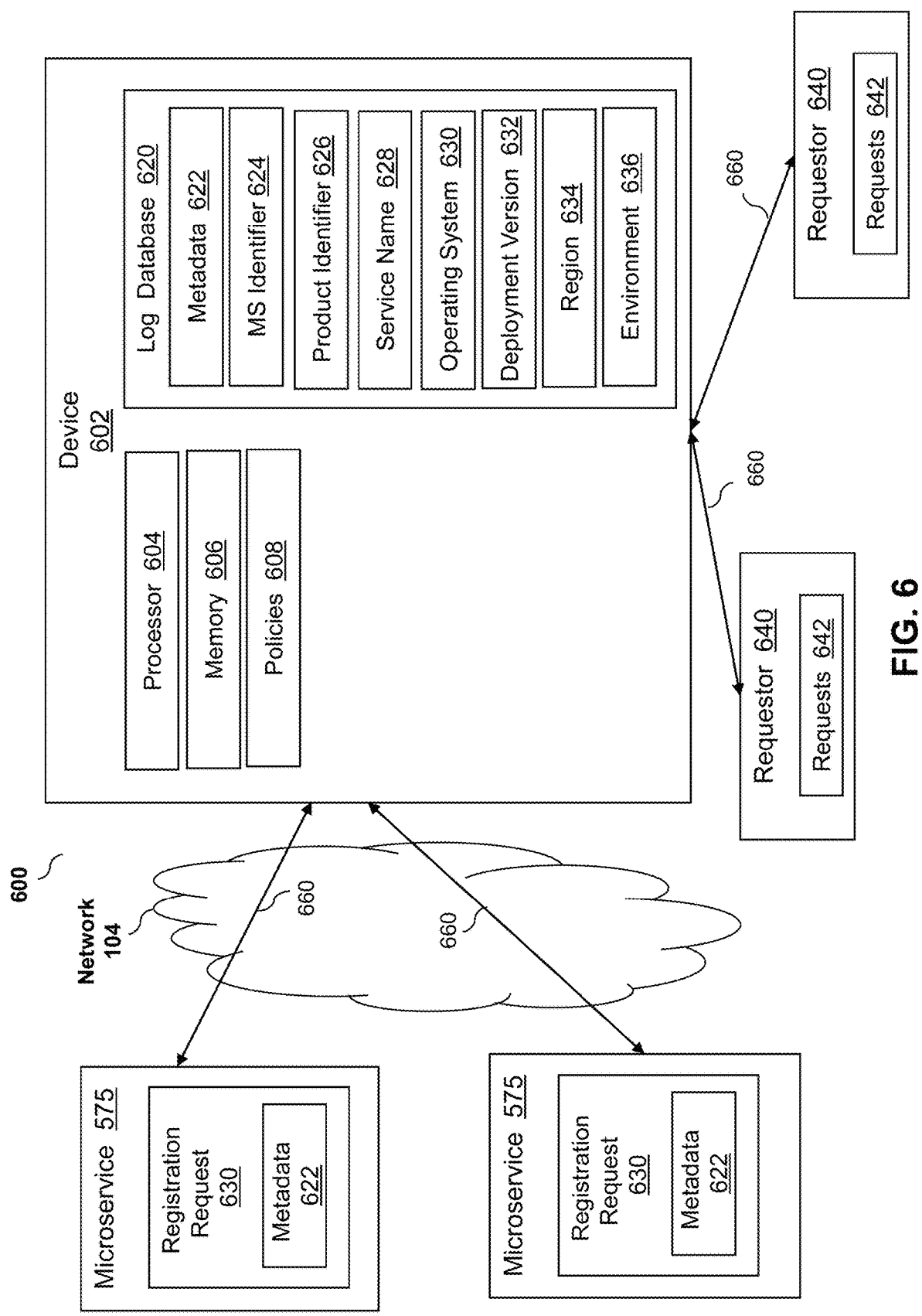
FIG. 6 is a block diagram of a system for recording metadata about a microservice for requests to the microservice.

Referring now to FIG. 6, depicted is a block diagram of a system 600 for recording metadata 622 about a microservice 575 for requests 642 to the microservice 575. The device 602 can include an intermediary device, intermediary to a plurality of microservices 575, a plurality of requestors 640, and/or a plurality of client devices (e.g., clients 102 of FIGS. 1A-1C and 5B). For example, the device 602 can include a proxy or a gateway to monitor calls and traffic, and route calls and traffic between a plurality of microservices 575 and a plurality of requestors 640. In embodiments, the device 602 can include a server. The device 602 can include one or more processors 604 coupled to a memory 606. The processor 604 can include or be coupled to a non-volatile memory 606 that stores computer instructions and an operating system. For example, the computer instructions can be executed by the processor 604 out of volatile memory 606 to perform all or part of the methods 580 and 700. The device 602 can include or execute policies 608 or rules to record metadata 622 corresponding to one or more microservices 575. The device 602 can include or execute policies 608 or rules to identify updates or changes to metadata 622 corresponding to one or more microservices 575. The device 602 can route calls or requests 242 between a plurality of microservices 575 and a plurality of requestors 640. In embodiments, the policies 608 can include rules for determining one or more regional issues and one or more microservices 575 corresponding to a respective region 634. The policies 608 can include rules for determining one or more deployment version issues and one or more microservices 575 corresponding to a respective deployment version 632. In some embodiments, the policies 608 can include instructions for balancing load, bandwidth data, usage data and/or traffic routing data within a network 104.

The device 602 can be implemented using hardware or a combination of software and hardware. For example, each component of the device 602 can include logical circuitry (e.g., a central processing unit or CPU) that responses to and processes instructions fetched from a memory unit (e.g., memory 606). Each component of the device 602 can include or use a microprocessor or a multi-core processor. A multi-core processor can include two or more processing units on a single computing component. Each component of the device 602 can be based on any of these processors, or any other processor capable of operating as described herein. Each processor can utilize instruction level parallelism, thread level parallelism, different levels of cache, etc. For example, the device 602 can include at least one logic device such as a computing device or server having at least one processor to communicate via a network 104. The components and elements of the device 602 can be separate components or a single component. For example, the device 602 can include combinations of hardware and software, such as one or more processors configured to initiate stop commands, initiate motion commands, and transmit or receive event data, for example. The device 602 can include a structured set of data. For example, the device 602 can include and/or store data corresponding to metadata 622. The device 602 can include a memory component (e.g., memory 606, log database 620) to store and retrieve data. The memory 606 can include a random access memory (RAM) or other dynamic storage device, coupled with the device 602 for storing information, and instructions to be executed by the device 602. The memory 606 can include at least one read only memory (ROM) or other static storage device coupled with the device 602 for storing static information and instructions for the server 1102. The memory 606 can include a storage device, such as a solid state device, magnetic disk or optical disk, coupled with the device 602 to persistently store information and instructions.

The device 602 can include a log database 620 (also referred to herein as log). The log database 620 can include a structured set of data (e.g., metadata 622, microservice data stored for the device 602). For example, the log database 620 can include a plurality of entries. The log database 620 can be arranged by microservice 575 and/or service 275. The log database 620 can include or correspond to a memory. The memory can be implemented using hardware or a combination of software and hardware. For example, each component of the log database 620 can include logical circuity (e.g., a central processing unit or CPU) that responses to and processes instructions fetched from a memory unit or database. The log database 620 can include or correspond to a random access memory (RAM) or other dynamic storage device, coupled with the processor 604 for storing information, and instructions to be executed by the processor 604. The log database 620 can include or correspond to at least one read only memory (ROM) or other static storage device coupled with the processor 604 for storing metadata 622. The log database 620 can include or correspond to a storage device, such as a solid state device, magnetic disk or optical disk, coupled with the processor 604 to persistently store information and instructions.

The log database 620 can include metadata 622. The metadata 622 can include information or data for one or more microservices 575, one or more requestors 640, and/or one or more services 275. In embodiments, the metadata 622 can include data or information for one or more microservices 575 including, but not limited to, identifiers 624, product identifiers 626, service names 628, operating system data 630, deployment version data 632, region data 634, and/or environment data 636. The identifiers 624 can include a microservice identifier, a value or label for a microservice 575. The identifiers 624 can include an IP address for a microservice 575 or domain name for a microservice 575. The product identifier 626 can include a product name for a microservice 575 or an identifier for a microservice 575. The service name 628 can include an identifier for a service 275 associated with one or more microservices 575. The service name 628 can include an IP address or domain name for a service 275 associated with one or more microservices 575. The operating system 630 can include information indicating an operating system of a microservice 575. The operating system 630 can include information indicating an operating system of a service 275. The operating system 630 can include information indicating an operating system of a requestor 640. The deployment version 632 can include information indicating a version of a microservice 575 or a type of a microservice 575. The deployment version 632 can include information indicating a version of a service 275 or a type of a service 275. The deployment version 632 can include information indicating a version of a requestor 640 or a type of requestor 640. The region 634 can include an area or region that one or more microservices 575 support. The region 634 can include an area or region that one or more services 275 support. In embodiments, the region 634 can correspond to a region of a network environment, a region of a computing environment (e.g., cloud network), or a region based in a physical location. The environment 636 can include an environment one or more microservices 575 are running or executing within. The environment 636 can include an environment in which the microservice 575 operates. The environment 636 can include an environment one or more services 275 are running or executing within. In embodiments, the metadata 622 can include dependency data for one or more microservices. A dependency, can include, but not limited to, a relationship between at least two microservices 575. For example, a dependency can correspond to an order in which one or more microservices 575 work together, are grouped together or collectively respond to one or more requests 642. The dependency can include a reliance of at least one microservice 575 to use the functionality, skill or services of at least one other microservice 575 to handle or execute a request 642 or multiple requests 642.

The device 602 can include a proxy or gateway to proxy, route, provide or otherwise transfer requests 642 from one or more requestors 640 to a plurality of microservices 575. The device 602 can include a proxy or gateway to proxy, route, provide or otherwise transfer requests 642 from between microservices 575. In embodiments, the plurality of microservices 575 can be a component of one or more services 275. For example, the microservices 575 can be the same as or substantially similar to microservices 575A-575N described above with respect to FIGS. 5A-5C. For example, two or more microservices 575 can be grouped together or interact with each other to provide the functionality or skills of at least one service 275. The microservices 575 can communicate with one or more other microservices 575 via application programming interface (APIs). The microservices can include metadata 622. The microservices 575 can generate a registration request 630 to register with the device 602. The registration request 630 can include metadata 622 corresponding the microservice 575 that generated and/or transmitted the registration request 630. For example, the registration request 630 can include metadata 622, such as but not limited to, identifiers 624, product identifiers 626, service names 628, operating system data 630, deployment version data 632, region data 634, and/or environment data 636.

In some embodiments, the microservices 575 can receive requests 642 from the device 602 via one or more channels 660. The channels 660 can include a session or connection between the device 602 and at least one microservice 575 and/or between at least one requestor 640 and at least one microservice 575. The channels 660 can include a session or connection between the device 602 and at least requestor 640. In some embodiments, the channels 660 can include a session or connection between two or more microservices 575. The channel 660 may include encrypted and/or secure sessions established between the device 602 and at least one microservice 575, between at least one requestor 640 and at least one microservice 575, and/or between two or more microservices 575. The encrypted session can include an encrypted connection between a device 602 and at least one microservice 575, between at least one requestor 640 and at least one microservice 575, and/or between two or more microservices 575.

The requestors 640 can include a client device, such as, but not limited to a computing device or a mobile device. For example, the requestors 640 can be the same as or substantially similar to clients 102(1)-102(n) of FIG. 1A, client 102 of FIG. 1B, computer 101 of FIG. 1C and/or clients 102 of FIG. 5B. Thus, the requestors 640 can include or correspond to an instance of any client device, mobile device or computer device described herein. The requestors 640 can include, but not limited to, a browser (e.g., web browser), client application, a desktop device, a mobile device, and/or an Internet of Things (IoT) device. The requestors 640 can communicate via the device 602 through network 104 to access one or more microservices 575. In some embodiments, the requestors 640 can transmit or forward requests 642 to the device 602 via one or more channels 660. The channels 660 can include a session or connection between the device 602 and at least one requestor 640. The channel 660 may include encrypted and/or secure sessions established between the device 602 and at least one requestor 640. The encrypted session can include an encrypted connection between a device 602 and at least one requestor 640.

Network 104 may be a public network, such as a wide area network (WAN) or the Internet. In some embodiments, network 104 may be a private network such as a local area network (LAN) or a company Intranet. Network 104 may be the same as or substantially similar to network 104 described above with respect to FIGS. 1A-1B, 4, and 5A-5B.

Each of the above-mentioned elements or entities is implemented in hardware, or a combination of hardware and software, in one or more embodiments. Each component of the device 602 may be implemented using hardware or a combination of hardware or software detailed above in connection with FIGS. 1-5B. For instance, each of these elements or entities can include any application, program, library, script, task, service, process or any type and form of executable instructions executing on hardware of a client device (e.g., device 602). The hardware includes circuitry such as one or more processors in one or more embodiments.

Figure 7B:
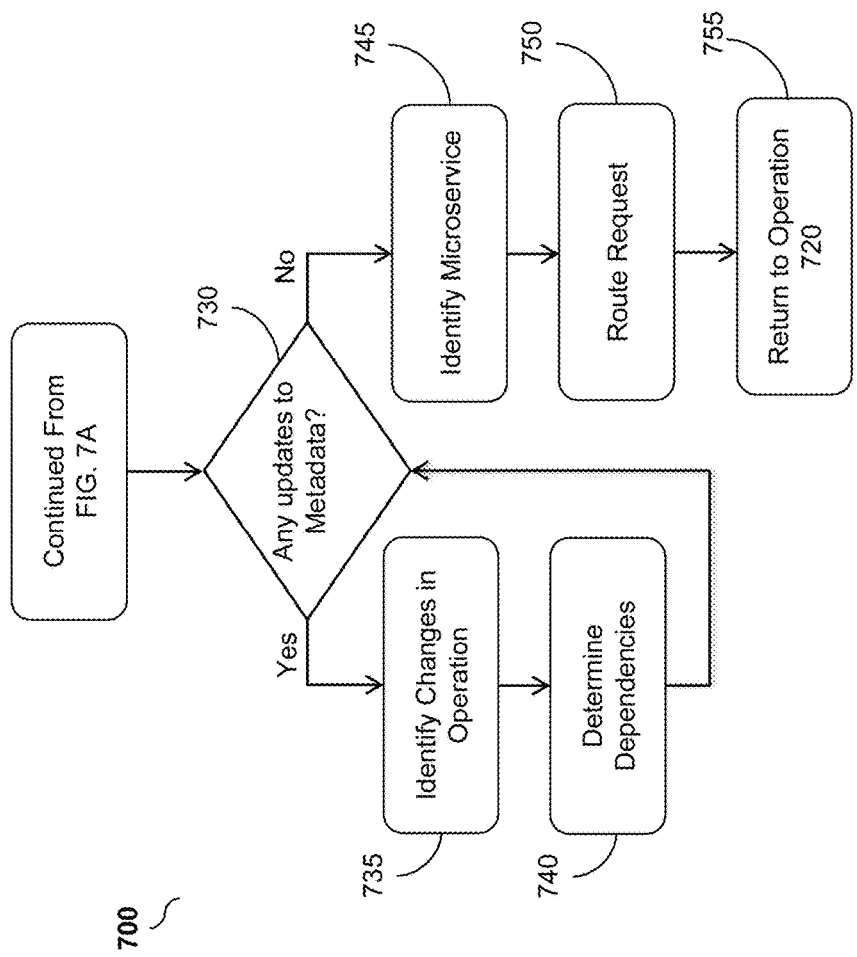

Referring now to FIGS. 7A-7B, depicted is a flow diagram of one embodiment of a method 700 for recording metadata about a microservice 575 for requests 642 to the microservice 575. The functionalities of the method 700 may be implemented using, or performed by, the components detailed herein in connection with FIGS. 1-6. Referring now to operation (705), and in some embodiments, a registration request 630 can be received. In embodiments, a device 602 configured as a proxy to one or more microservices 575 of a service 275 can receive a registration request 642 to register a microservice 575 of the one or more microservices 575 with the device 602.

In embodiments, the registration can be initiated by a user (e.g., system administrator) through a command line or a user interface. The device 602 can receive the registration request 630 responsive to the command or instruction from the user through the command line or the user interface. In embodiments, the microservice 575 can generate and transmit the registration request 642 responsive to the microservice 575 being created or generated. The microservice 575 can generate and transmit the registration request 642 responsive to metadata 622 of a microservice 575 being changed, modified or updated. For example, the microservice 575 can generate and transmit the registration request 642 responsive to a region 634 and/or environment 636 of the microservice 575 being changed. The microservice 575 can generate and transmit the registration request 642 responsive to a deployment version 632 and/or an operating system 630 of the microservice 575 being updated. In some embodiments, the registration request 642 can be generated and transmitted to the device 602 responsive to the microservice 575 being assigned to a new proxy (e.g., device 602). The registration request 642 can be generated and transmitted to the device 602 responsive to the microservice 575 being assigned to a service 275.

Referring now to operation (710), and in some embodiments, metadata 622 can be received. In embodiments, the device 602 can receive the metadata 622 as part of or included with the registration request 630. In embodiments, the metadata 622 can be received as part on or during the registration and/or configuration of the microservice 575. For example, the metadata 622 can be received or provided to the device 602 responsive to the command or instruction from the user through the command line or the user interface. In embodiments, the microservice 575 can generate the registration request 642 to include metadata 622 corresponding to the microservice 575 that generated the registration request 642 and/or transmits the registration request 642. The microservice 575 can generate the registration request 642 to include an identifier 624 for the microservice 575. The microservice 575 can generate the registration request 642 to include a product identifier 626 for the microservice 575. The microservice 575 can generate the registration request 642 to include a service name 628 for one or more services 275 the microservice 575 is associated with or handles requests 642 for. The microservice 575 can generate the registration request 642 to include an operating system of the microservice 575. The microservice 575 can generate the registration request 642 to include a deployment version of the microservice 575. The microservice 575 can generate the registration request 642 to include a region 634 and/or environment 636 associated with the microservice 575 or that the microservice 575 is executing within. The device 602 can receive, during registration, from the microservice metadata 622, a product identifier 626, an operating system 630 and/or an environment 636 in which the microservice operates.

Referring now to operation (715), and in some embodiments, metadata 622 can be recorded. In embodiments, the device 602, during registration of the microservice 575 with the device 602, can receive metadata 622 provided by the microservice 575 about the microservice 575. The metadata 622 can include or identify an identifier 624 of the microservice 575, a deployment version 632 of the microservice 575 and a region 634 of deployment of the microservice 575. The device 602 can store the metadata 622 in association with the microservice 575. The device 602 can store and record the metadata 622 for one or more microservices 575 in a log or log database 620. The log database 620 can be a component of the device 602. In some embodiments, the log database 620 can be a remote database communicatively coupled with the device 602. The device 602 can generate an entry in the log database 620 for each microservice 575 responsive to registering a microservice 575. The device 602 can generate an entry in the log database 620 for each service 275 the one or more registered microservices 575 are associated with or perform tasks or functions for.

The device 602 can organize the log database 620 by service 275 such that each entry includes metadata 622 and information corresponding to at least one service 275. The device 602 can organize the log database 620 by microservice 575 such that each entry includes metadata 622 and information corresponding to at least one microservice 575. The device 602 can store and record metadata 622 in the log database 620 corresponding to a microservice 575 including, but not limited to, identifiers 624, product identifiers 626, service names 628, operating system data 630, deployment version data 632, region data 634, and/or environment data 636. The device can store and record metadata 622 in the log database 620 corresponding to a microservice 575 including, but not limited to, an IP address for a microservice 575, a domain name for a microservice 575, an IP address for a service 275, and/or a domain name for a service 275. The device can store and record metadata 622 in the log database 620 corresponding to a microservice 575 including, but not limited to, dependency data for one or more microservices.

Referring now to operation (720), and in some embodiments, a request 642 can be received. In embodiments, the requests 642 can be routed to the device 602 by the microservice 575. The device 602 can receive a plurality of requests 642 routed or forwarded to the device 602. For example, a microservice 575 can route a request 642 from a requestor 640 (e.g., endpoint, client) to the device 602 responsive to or after registering with the device 602. The one or more microservice 575 can route requests 642 to the one or more microservices 575 to the device 602. In embodiments, the device 602 can receive one or more requests 642 from one or more requestors and/or one or more requestors 640. In embodiments, the device 602 can be intermediary to the one or more requestors 640 and the one or more microservices 575. The request 642 can be transmitted by a requestor 640 to one or more microservices 575 through the device 602 such that the request 642 passes through the device 602 to the one or more microservices 575. The device 602 can identify properties of the request 642 as the request 642 passes through the device 602 to the one or more microservices 575.

In embodiments, the device 602 can record, responsive to a plurality of requests 642 to access the microservice 575, to a log 620 the metadata 622 of the microservice 575 registered with the device 602 in association with each of the plurality of requests 642. The device 602 can be intermediary to a plurality of requestors 640 and a plurality of microservices 575. The device 602 can receive a plurality of requests 642 to one or more microservices 575 of the plurality of microservices 575 originating from the plurality of requestors 640 accessing the plurality of microservices 575 or attempting to accessing the plurality of microservices 575. The device 602 can receive a plurality of requests 642 to one or more microservices 575 of the plurality of microservices 575 originating from one or more microservices 575.

At least one requestor 640 can generate and/or transmit a request 642 (e.g., call) to access at least one application, service or microservice 575 corresponding to an application or service. The requestor 640 can transmit the request 642 to the device 602 to be forwarded to the respective microservice 575. In some embodiments, the device 602 can be a proxy or gateway. The device 602 can proxy the request 642 from the requestor 640 to at least one microservice 575 or a plurality of microservices 575. The request 642 can include a call for at least one service 275, execution of at least one service 275, at least one application and/or execution of at least one application. The request 642 can include a request for at least one microservice 575 to perform a function or skill of at least one service 275 or at least one application. For example, a service 275 can include a collection or plurality of microservices 575. In embodiments, a service 275 can include, be built and/or generated using one or more microservices 575 such that each of the one or more microservices 575 perform part of the function of the respective service 275. In some embodiments, an application can include a collection or plurality of microservices 575. In embodiments, an application can include, be built and/or generated using one or more microservices 575 such that each of the one or more microservices 575 perform part of the function of the respective application. The request 642 can identify at least one service 575, at least one microservice 575 associated with at least one service 275, at least one application and/or at least one microservice 575 associated with the application. For example, a service 275 can include a collection or plurality of microservices 575. In embodiments, a service 275 can include, be built and/or generated using one or more microservices 575 such that each of the one or more microservices 575 perform part of the function of the respective service 275.

Referring now to operation (725), and in some embodiments, a request 642 can be logged. The device 602 can log, store and record the requests 642 received for a microservice 575 in an entry for the microservice 575 of the log database 620. The device 602 can log, store and record metadata corresponding to a request 642 or included with a request 642 in an entry for the microservice 575 of the log database 620. In embodiments, the request 642 can include metadata 622. For example, the request 642 can include metadata 622 identifying a service 275 and/or identifying one or more microservices 575. The request 642 can include metadata 622 including a region 634 or environment 636. In embodiments, the device 602 can record, responsive to a plurality of requests 642 to access the microservice 575, to a log 620, the metadata 622 of the microservice 575 registered with the device 602 in association with each of the plurality of requests 642.

Referring now to operation (730), and in some embodiments, updates to metadata 622 can be determined. The device 602 can determine if any changes, modifications or updates have been received or occurred to metadata 622 for one or more microservices 575. In some embodiments, responsive to receiving a request 642, the device 602 can determine one or more microservices 575 to route the respective request 642 to or to handle the respective request 642. The device 602, before routing the request 642, can determine if any changes and/or updates have occurred to metadata 622 of the one or more microservices 575 selected to receive the request 642.

In some embodiments, the device 602 can search for metadata 622 updates responsive to receiving an error message or issue in attempting to route a request 642 to at least one microservice 575. For example, the device 602 can route or forward a request 642 to a microservice 575. The device 602 can receive an error message in response to routing the request 642 to the microservice 575. In some embodiments, the request 642 can returned to the device 602 due to an issue with the selected microservice 575. The device 602 can determine that there was an error or issue in routing the request 642 to the microservice 575.

Referring now to operation (735), and in some embodiments, changes to metadata 622 can be determined. In embodiments, the device 602 can receive, from a microservice 575, updates to the metadata 622 of the microservice 575. The device 602 can receive, from a plurality of microservices 575, updates to the metadata 622 each of the plurality of microservices 575. For example, the microservices 575, responsive to being updated or changes to the microservices metadata 622 can transmit the updates or changes to the device 602. The device 602 can update the entry in the log database 620 for the microservice 575 to include the updated or changed metadata 622.

In embodiments, an error or issue with a microservice 575 can be in response to a change or update to the metadata 622 of the microservice 575. For example, the error or issue can be in response to a change or update to the metadata 622 including a change in operation of the microservice 575. The device 602 can use the log database 620 to determine or identify changes in the metadata 622 for a microservice 575. In embodiments, the device 602 can identify, based at least on the log 620, an issue with operation of the microservice 575 attributable to a change in the deployment version 632 and/or the region 634 of the microservice. In some embodiments, the device 602 can transmit a request to the microservice 575 to verify metadata 622 of the microservice 575. For example, the device 602 can transmit a request to verify at least one of an identifier 624, product identifier 626, service name 628, operating system 630, deployment version 632, region 634, and/or environment 636 stored in the log 620 for the microservice 575. The device 602 can compare the response from the microservice 575 to determine a change or update in at least one of an identifier 624, product identifier 626, service name 628, operating system 630, deployment version 632, region 634, and/or environment 636 stored in the log 620 for the microservice 575.

In embodiments, the device 602 can identify, based at least on the log 620, an issue with operation of the microservice 575 attributable to a change in the deployment version 632 or the region 634 of the microservice 575. The change in operation can be due to a change in a deployment version of the microservice 575 and/or a change in a region 634 of the microservice 575. For example, device 602 can determine the deployment version 632 of the microservice 575 has changed or been updated resulting in an error in routing a request 642 to the microservice 575. The device 602 can determine the region 634 of the microservice 575 has changed or been updated resulting in an error in routing a request 642 to the microservice 575. In embodiments, the change in operation of the microservice 575 can be attributable to one or more changes to the microservice 575 identified by one of the product identifier 626, the operating system 630, and/or environment 636. For example, device 602 can determine the product identifier 626 of the microservice 575 has changed or been updated resulting in an error in routing a request 642 to the microservice 575. The device 602 can determine the operating system 630 of the microservice 575 has changed or been updated resulting in an error in routing a request 642 to the microservice 575. The device 602 can determine the environment 636 in which the microservice 575 operates has changed or been updated resulting in an error in routing a request 642 to the microservice 575. In some embodiments, the device 602 can identify, via a user interface and based on the metadata 622 recorded to the log 620, a change in operation of the microservice 575 in connection with one of the deployment version 632 and/or the region 634 of the microservice 575. The user interface can be the same as or substantially similar to user interface 123 described above with respect to FIG. 1C, service graph display 514 of FIGS. 5A-5C. In some embodiments, a user (e.g., system administrator) can identify one or more issues with the operation of one or more microservices 575. The user can identify one or more issues with the operation of one or more microservices 575 based on metadata 622 and/or metrics generated for the one or more microservices 575. For example, the user can be provided the metadata 622 and/or metrics through the user interface or a service graph 505 generated for the one or more microservices 575 and identify an issue with the operation of the one or more microservices 575.

Referring now to operation (740), and in some embodiments, dependencies can be determined. The device 602, responsive to the changes or updates to the metadata 622 for at least one microservice 575 can determine the dependencies of the microservice 575 based in part on the changes or updates to the metadata 622. For example, the device 602 can determine if the changes or updates to the metadata 622 resulted in any changes to one or more dependencies of the microservice 575. In embodiments, the device 602 can store or record the dependency of a microservice 575 in the log database 620. The device 602 can determine a dependency based in part on an order of requests 642 made or communicated between two or more microservices 575 responsive to an initial or original request 642. In some embodiments, the device 602 can use a service graph 505 to identify an order in which one or more microservices 575 can work together, be grouped together or collectively respond to one or more requests 642. The dependency can include a reliance of at least one microservice 575 to use the functionality, skill or services of at least one other microservice 575 to handle or execute a request 642. For example, the device 602, using the service graph 505, can determine which microservices 575 a first microservice 575 is linked with or dependent on. The service graph 505 can include or identify multiple dependencies. The device 602 can determine the multiple dependencies included with or identified by the service graph 505 and each of the microservices 575 associated with the multiple dependencies. The device 602 can determine a new dependency for a microservice based in part on the changes or updates to the metadata 622 of the microservice 575. The method 700 can return to operation 730 to determine if anymore updates or changes to metadata 622 of one or more microservices 575 need to be identified and/or updated in the log database 620.

Referring now to operation (745), and in some embodiments, the device 602 can identify a microservice 575. The device 602 can identify a microservice 575 to route a request 642 to for the microservice 575 to handle the request 642 or a portion of the request 642. The device 602 can identify two or more microservices 575 to route a request 642 to for the two or more microservices 575 to handle the request 642 or one or more portions of the request 642. In some embodiments, the device 602 can, responsive to the changes in metadata 622 of one or more microservices 575, select one or more microservices 575 to receive a request 642. In embodiments, the device 602 can, responsive to the changes in operation of one or more microservices 575, select one or more microservices 575 to receive a request 642. For example, the device 602 can select a microservice 575 to route the request 642 to based in part on a deployment version 632 of the microservice 575. The device 602 can select a microservice 575 to route the request 642 to based in part on a region 634 of deployment of the microservice 575. The device 602 can select a microservice 575 to route the request 642 to based in part on an environment 636 of the microservice 575. The device 602 can select a microservice 575 to route the request 642 to based in part on a service name 628 associated with the microservice 575. The device 602 can select a microservice 575 to route the request 642 to based in part on an operating system 630 of the microservice 575. The device 602 can select a microservice 575 to route the request 642 to based in part on a combination of two or more of a identifier 624 of the microservice 575, product identifier 626 of the microservice 575, service name 628 associated with the microservice 575, operating system 630 of the microservice 575, deployment version 632 of the microservice 575, region 634 of the microservice 575, and environment 636 of the microservice 575. In embodiments, the device 602 can select a microservice 575 to route the request 642 to based in part on a service graph 505. The device 602 can select a microservice 575 to route the request 642 to based in part on a service 275 associated with the request 642 or a service 275 identified in the request 642. The device 602 can select a microservice 575 to route the request 642 to based in part on a requestor 640 or requestor transmitting the request 642.

Referring now to operation (750), and in some embodiments, a request 642 can be routed. The device 602 can route or forward the request 642 to a selected microservice 575. The device 602 can route or forward the request 642 to two or more selected microservices 575. For example, the device 602 can determine an intended microservice 575 for a request 642 and transmit the request 642 to the intended microservice 575. The device 602 can select at least one microservice 575 for a request 642 and transmit the request 642 to the selected microservice 575. In embodiments, the device 602 can forward or transmit the request 642 to a microservice 575 through at least one channel 660 established between the respective microservice 575 and the device 602.

In embodiments, the device 602 can identify, based at least on the log 620, an improvement in operation of the microservice 575 attributable to one or more changes to the microservice 575 identified in the metadata 622. For example, the device can maintain metrics for one or more microservices 575. The device 602 can compare metrics corresponding to a previous request 642 to the metrics from a request 642 handled by the microservice 575 after or subsequent to the changes in the metadata 622 of the microservice 575. The device 602 can identify an improvement in the performance of the microservice 575 responsive to the changes in the metadata 622 of the microservice 575. In some embodiments, the device 602 can determine that the microservice 575 received the request 642 in a shorter time frame or time period as compared to a request routed to the microservice 575 prior to the changes in the metadata 622 of the microservice 575. The device 602 can determine that the microservice 575 handled, executed and/or process the request 642 in a shorter time frame or time period as compared to a request routed to the microservice 575 prior to the changes in the metadata 622 of the microservice 575. The device 602 can determine that the microservice 575 completed one or more tasks corresponding to the request 642 in a shorter time frame or time period as compared to a request routed to the microservice 575 prior to the changes in the metadata 622 of the microservice 575. The device 602 can determine that two or more microservices 575 completed one or more tasks corresponding to the request 642 in a shorter time frame or time period as compared to a request routed to the two or more microservices 575 prior to the changes in the metadata 622 of the microservice 575.

In embodiments, the metadata 622 and/or metrics generated for a microservice 575 can be presented to a user through a user interface of device 602. For example, a service graph 505 or other forms of displays can be generated showing the metadata 622 and/or metrics generated for a microservice 575. The user (e.g., system administrator) can identify one or more issues with the operation of one or more microservices 575 based on metadata 622 and/or metrics provided within the service graph 505. The user, though the user interface, can compare metrics corresponding to a previous request 642 to the metrics from a request 642 handled by the microservice 575 after or subsequent to the changes in the metadata 622 of the microservice 575. The user, though the information provided in the service graph 505 displayed in the user interface, can identify an improvement in the performance of the microservice 575 responsive to the changes in the metadata 622 of the microservice 575. In some embodiments, the user, though the information provided in the service graph 505 displayed in the user interface, can determine that the microservice 575 received the request 642 in a shorter time frame or time period as compared to a request routed to the microservice 575 prior to the changes in the metadata 622 of the microservice 575. The user, though the information provided in the service graph 505 displayed in the user interface, can determine that the microservice 575 handled, executed and/or process the request 642 in a shorter time frame or time period as compared to a request routed to the microservice 575 prior to the changes in the metadata 622 of the microservice 575. The user, though the information provided in the service graph 505 displayed in the user interface, can determine that the microservice 575 completed one or more tasks corresponding to the request 642 in a shorter time frame or time period as compared to a request routed to the microservice 575 prior to the changes in the metadata 622 of the microservice 575. The user, though the information provided in the service graph 505 displayed in the user interface, can determine that two or more microservices 575 completed one or more tasks corresponding to the request 642 in a shorter time frame or time period as compared to a request routed to the two or more microservices 575 prior to the changes in the metadata 622 of the microservice 575. The method 700 can return to operation 720 to wait for a next or subsequent request 642. The method 700 can return to operation 720 to process or route a next or subsequent request 642.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
   receiving, by a device, metadata provided by a microservice about the microservice, the metadata identifying a version of the microservice;
   recording, by the device, the metadata to a log in association with one or more requests to access the microservice;
   receiving, by the device subsequent to recording the metadata to the log, a response from the microservice comprising metadata that is different than the metadata recorded to the log;
   determining, by the device, a change in the version of the microservice based on a comparison of the metadata recorded in the log with the different metadata received with the response from the microservice; and
   providing, by the device, for display via a user interface information about the change in the microservice.

2. The method of claim 1, further comprising receiving, by the device, the metadata provided by the microservice about the microservice as part of registration of the microservice with the device.

3. The method of claim 1, wherein the device is configured to be a proxy to the microservice.

4. The method of claim 1, wherein the metadata includes a location of the microservice.

5. The method of claim 4, further comprising determining, by the device, a change in the location of the microservice responsive to metadata received with the response from the microservice being different than the metadata recorded to the log.

6. The method of claim 1, further comprising comparing, by the device, the metadata received with the response to the metadata recorded in the log for at least one of the one or more requests.

7. The method of claim 1, further comprising receiving, by the device, the one or more requests for the microservice and forwarding the one or more requests to the microservice.

8. A method comprising:
   receiving, by a device, metadata provided by a microservice about the microservice, the metadata identifying a location of the microservice;
   recording, by the device, the metadata to a log in association with one or more requests to access the microservice;
   receiving, by the device subsequent to recording the metadata to the log, a response from the microservice comprising metadata that is different than the metadata recorded to the log;
   determining, by the device, a change in the location of the microservice based on a comparison of the metadata recorded in the log with the different metadata received with the response from the microservice; and
   providing, by the device, for display via a user interface information about the change in the microservice.

9. The method of claim 8, further comprising receiving, by the device, the metadata provided by the microservice about the microservice as part of registration of the microservice with the device.

10. The method of claim 8, wherein the device is configured to be a proxy to the microservice.

11. The method of claim 8, wherein the metadata includes a version of the microservice.

12. The method of claim 11, further comprising determining, by the device, a change in the version of the microservice responsive to metadata received with a response from the microservice being different than the metadata recorded to the log.

13. The method of claim 8, further comprising comparing, by the device, the metadata received with the response to the metadata recorded in the log for at least one of the one or more requests.

14. The method of claim 8, further comprising receiving, by the device, the one or more requests for the microservice and forwarding the one or more requests to the microservice.

15. A system comprising:
one or more processors, coupled to memory and configured to:
receive metadata provided by a microservice about the microservice, the metadata identifying one of a version or location of the microservice;
record the metadata to a log in association with one or more requests to access the microservice;
receive, subsequent to recordation of the metadata to the log, a response from the microservice comprising metadata that is different than the metadata recorded to the log;
determine a change in one of the location or the version of the microservice responsive to a comparison of the metadata recorded in the log with the different metadata received with the response from the microservice; and
provide for display via a user interface information about the change in the microservice.

16. The system of claim 15, wherein the one or more processors are further configured to receive the metadata provided by the microservice about the microservice as part of registration of the microservice with the one or more processors.

17. The system of claim 15, wherein the one or more processors are further configured to compare the metadata received with the response to the metadata recorded in the log for at least one of the one or more requests.

18. The system of claim 15, wherein the one or more processors are further configured to receive the one or more requests for the microservice and forwarding the one or more requests to the microservice.

19. The system of claim 15, wherein the metadata includes an operating system and an environment of the microservice.

20. The system of claim 15, wherein the one or more processors are further configured to determine a change in operation of the microservice attributable to one of an operating system or an environment of the microservice responsive to comparing the metadata received with the response to the metadata recorded in the log for at least one of the one or more requests.

* * * * *